June 3, 1958  F. BRUMEK  2,837,084
ELECTRIC HEATING MASSAGER
Filed April 18, 1956  3 Sheets-Sheet 1
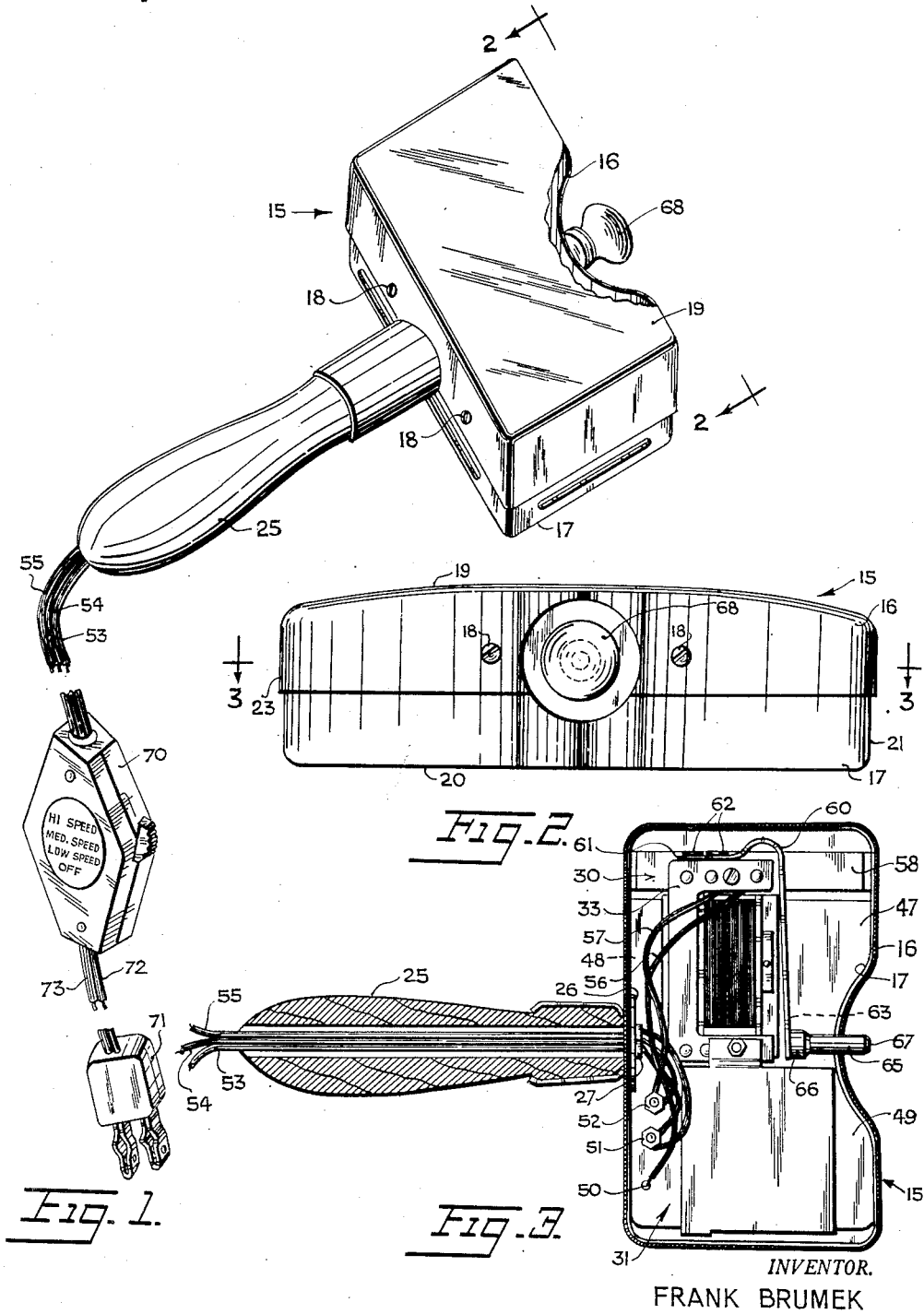
INVENTOR.
FRANK BRUMEK
BY
*Zoltan Pitlochek*
ATTORNEY

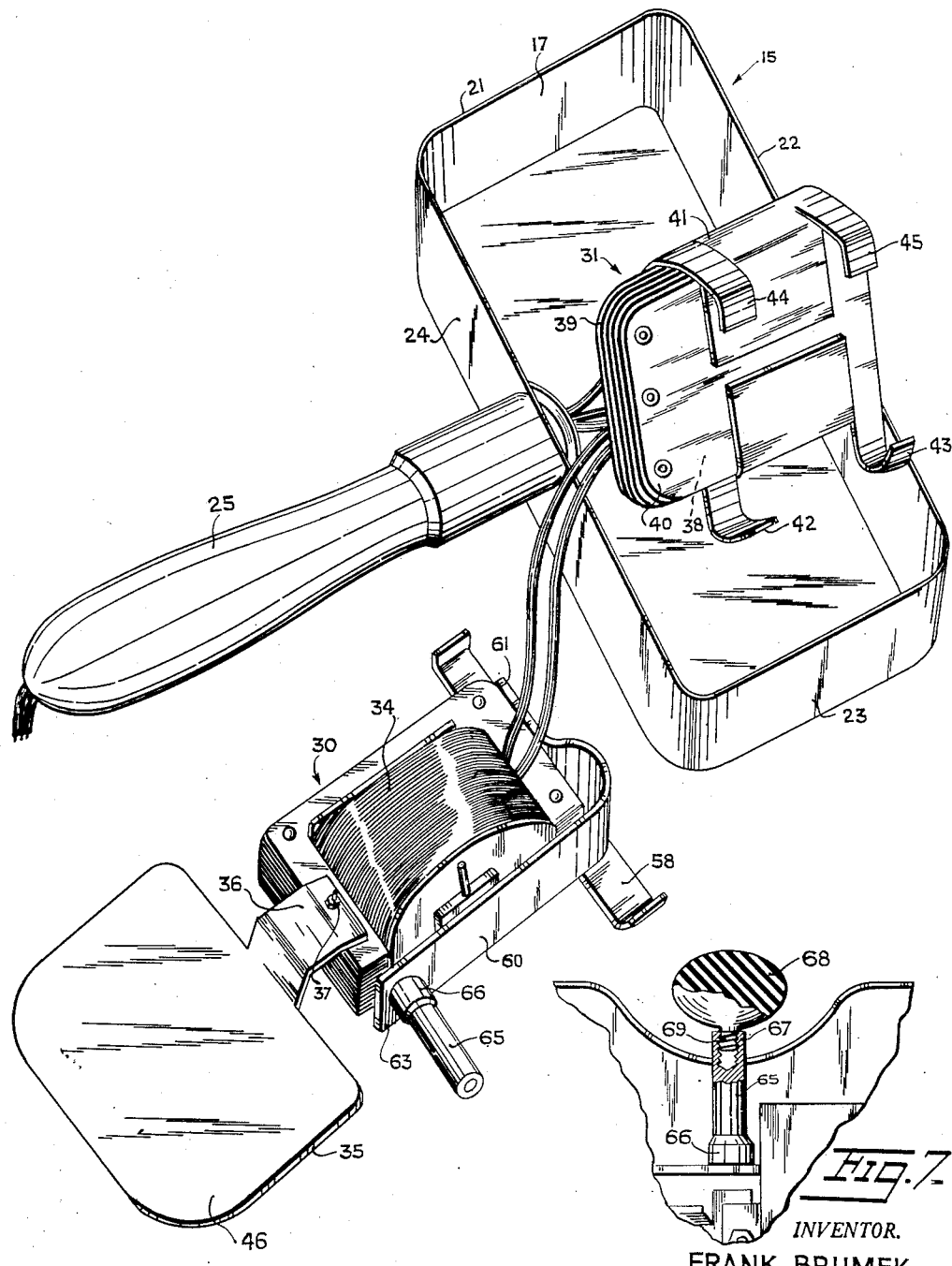

June 3, 1958 F. BRUMEK 2,837,084
ELECTRIC HEATING MASSAGER
Filed April 18, 1956 3 Sheets-Sheet 3

INVENTOR.
FRANK BRUMEK
BY Zoltan F. Holochek
ATTORNEY

United States Patent Office 2,837,084
Patented June 3, 1958

2,837,084

ELECTRIC HEATING MASSAGER

Frank Brumek, New York, N. Y., assignor of one-half to Hans E. Mees

Application April 18, 1956, Serial No. 578,946

4 Claims. (Cl. 128—24.1)

This invention relates to new and useful improvements in massage and heating devices for therapy and general use.

More particularly, the present invention proposes the construction of an improved massage device electrically heated and adapted for use and control by one hand easily and conveniently.

Still further, the present invention proposes forming the new device with an electric vibrator and electric heating unit mounted in a casing in an interlocking and co-operating manner to vibrate and heat an outer massage surface of the casing.

Another object of the invention proposes forming the casing with an opening and the vibrator with a vibrating arm and shaft extending through the casing opening removably to mount various massage attachments on the vibrator arm shaft.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a vibrator massage device partly in section, constructed and arranged in accordance with the present invention.

Fig. 2 is a sectional view taken on line 2—2 of Fig. 1.

Fig. 3 is a sectional view taken on line 3—3 of Fig. 2.

Fig. 4 is a view similar to Fig. 1 but showing the top casing half removed and the vibrator and heating unit separated and removed from the casing.

Fig. 7 is a fragmentary view similar to Fig. 3 but showing the massage knob attached to the vibrator arm shaft.

Figures 5, 8:
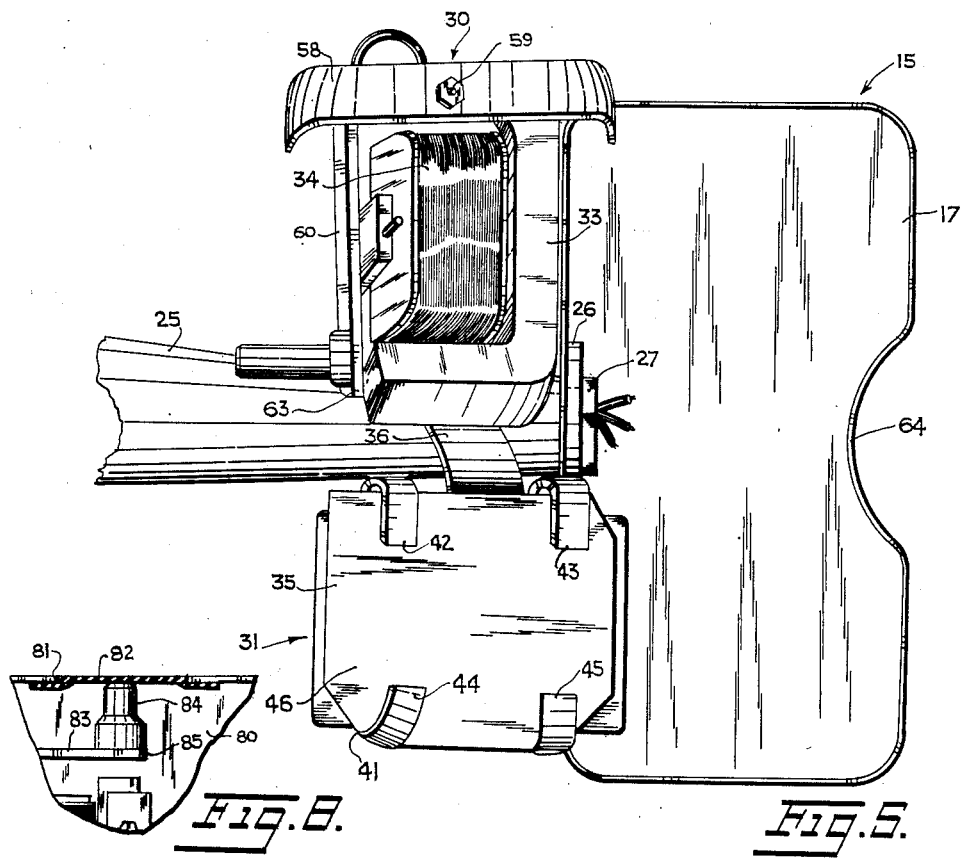
Fig. 5 is a view similar to Fig. 4 but showing the vibrator and heating unit connected together for insertion into the casing.
Fig. 8 is a view similar to Fig. 7 but illustrating a modification of the present invention.
Figure 6:
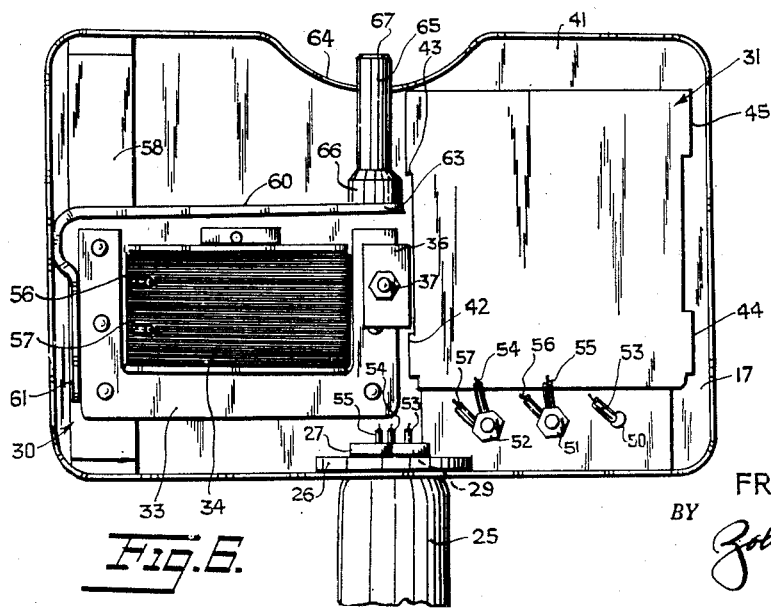
Fig. 6 is a view similar to Fig. 5 but showing the vibrator and heating unit connected together and inserted in the casing.

Referring more particularly to the drawings, the massage device in accordance with the first form of the invention illustrated in Figs. 1 to 7, inclusive, has a casing designated generally by the reference numeral 15.

Casing 15 is substantially rectangular and preferably is hollow with an upper half 16 and a lower half 17 held together as by screws 18. The casing 15 has a front 19, a rear 20 and sides 21, 22, 23 and 24 which are all a part of the smooth outer massage surface of the casing.

A hollow handle 25 is secured to the casing lower half 17 as by a washer 26 and nut 27, the casing end 29 of the handle being threaded.

An electric vibrator 30 and an electric heating unit 31 are mounted in the casing. Vibrator 30 has the usual plates 33 and wire coil 34. An anchor plate 35 is secured by a tab 36 and bolt 37 to the plates 33 at one side of the vibrator.

Heating unit 31 has the usual heating coils or element 38 encased between insulating plates 39 and 40 and held in a cover clip or jacket 41 having four spaced bottom brackets 42, 43, 44 and 45 slidably to receive the flat portion 46 of anchor plate 35 and frictionally to hold the anchor plate of the vibrator.

Insulator sheets 47 and 48 are provided over and under the vibrator and insulator sheet 49 is provided over the heating unit 31.

Terminals 50, 51 and 52 are provided on the heating unit 31. Electric conduits or wires 53, 54 and 55 extend through the handle and into the casing. Conduit 53 is connected with terminal 50 and conduits 54 and 55 are connected with terminals 52 and 51, respectively. In addition, conduits or wires 56 and 57 extend from wire coil 34 of vibrator 32 and are connected with terminals 51 and 52, respectively. Vibrator 32 is also provided with a bottom brace 58 secured by a bolt 59 to the plates 33.

A vibrator arm 60 is provided on the vibrator 32 secured at one end 61 by bolts 62 to the plates 33 of the vibrator. The vibrator arm 60 has a free end 63 disposed inside the casing adjacent an opening 64 in the casing. A vibrator arm shaft 65 is secured at one end 66 to the free end 63 of the vibrator arm and has a threaded end 67 which extends through the vibrator arm shaft opening 64 in the casing and outside the casing.

A massage element or knob 68 has a threaded shank 69 which removably secures the element or knob to the threaded end 67 of the vibrator arm shaft outside the casing.

A multiple switch 70 to which the conduits or wires 53, 54 and 55 are connected provides speed control means for the vibrator 32. A plug 71 and wires 72 and 73 connect the switch 70 and conduits 53, 54 and 55 with a source of electricity.

The front 19 of casing 15 is curved in contour and the rear 20 of the casing is flat to provide different massage effects and for resting the device flat on its back when not in use.

The modification of the invention illustrated in Fig. 8 is characterized by the provision of a casing 80 having an opening 81 which is covered by a smooth flexible massage cover 82. A vibrator arm 83 has a vibrator arm shaft 84 secured to its free end 85. This vibrator arm shaft 84 extends toward the cover 82 and vibrates the cover for a novel and useful massage effect.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A massage device comprising a casing having a smooth outer massage surface, a hollow handle connected with the casing, an electric vibrator and an electric heating unit mounted in the casing to vibrate and heat the smooth outer massage surface, electric conduits extending through the handle into the casing and connected with the vibrator and heating unit to connect the vibrator and heating unit with a source of electricity, and speed control means for the vibrator, said vibrator having an anchor plate and said heating unit having a cover clip with spaced brackets slidably to receive and frictionally to hold the anchor plate of the vibrator.

2. A massage device comprising a casing having a smooth outer massage surface, a hollow handle connected with the casing, an electric vibrator and an electric heating unit mounted in the casing to vibrate and heat the smooth outer massage surface, electric conduits extending through the handle into the casing and connected with the vibrator and heating unit to connect the vibrator and heating unit with a source of electricity, speed control means for the vibrator, and a massage knob connected with the vibrator and disposed outside the casing, said vibrator having an anchor plate and said heating unit having a cover clip with spaced brackets slidably to receive and frictionally to hold the anchor plate of the vibrator.

3. A massage device comprising a casing having a smooth outer massage surface, a hollow handle connected with the casing, an electric vibrator and an electric heating unit mounted in the casing to vibrate and heat the smooth outer massage surface, electric conduits extending through the handle into the casing and connected with the vibrator and heating unit to connect the vibrator and heating unit with a source of electricity, speed control means for the vibrator, said vibrator having a vibrator arm with a free end disposed inside the casing, said casing having a vibrator arm shaft opening, a vibrator arm shaft extending from the free end of the vibrator arm through the vibrator arm shaft opening, and a massage knob mounted on the vibrator arm shaft outside the casing, said vibrator having an anchor plate and said heating unit having a cover clip with spaced brackets slidably to receive and frictionally to hold the anchor plate of the vibrator.

4. A massage device comprising a casing having a smooth outer massage surface, a hollow handle connected with the casing, an electric vibrator and an electric heating unit mounted in the casing to vibrate and heat the smooth outer massage surface, electric conduits extending through the handle into the casing and connected with the vibrator and heating unit to connect the vibrator and heating unit with a source of electricity, speed control means for the vibrator, said vibrator having a vibrator arm with a free end disposed inside the casing, said casing having a vibrator arm shaft opening and a vibrator arm shaft extending from the free end of the vibrator arm through the vibrator arm shaft opening with a threaded end disposed outside the casing, and a massage element having a threaded shank removably to connect to the threaded end of the vibrator arm shaft, said vibrator having an anchor plate and said heating unit having a cover clip with spaced brackets slidably to receive and frictionally to hold the anchor plate of the vibrator.

References Cited in the file of this patent

UNITED STATES PATENTS

| | | |
|---|---|---|
| 1,889,487 | Nachies | Nov. 29, 1932 |
| 1,913,250 | Simmons | June 6, 1933 |
| 2,265,729 | Hall | Dec. 9, 1941 |
| 2,276,510 | Newton | Mar. 17, 1942 |